United States Patent [19]
Fink

[11] 3,895,880
[45] July 22, 1975

[54] ROLLER ATTACHMENT FOR TRUCKS
[75] Inventor: Robert Fink, Youngstown, Ohio
[73] Assignee: Inglis Nurseries, Inc., Youngstown, Ohio
[22] Filed: Aug. 15, 1973
[21] Appl. No.: 388,480

[52] U.S. Cl. .................. 404/86; 180/20; 404/128; 404/129; 404/132
[51] Int. Cl.² ......................................... E01C 19/26
[58] Field of Search ....... 404/85, 86, 103, 126, 129, 404/132, 128; 180/20

[56] References Cited
UNITED STATES PATENTS

| | | | |
|---|---|---|---|
| 1,375,185 | 4/1921 | Seiter | 404/132 UX |
| 1,458,751 | 6/1923 | Gailor | 180/20 |
| 1,757,691 | 5/1930 | Thompson | 404/132 X |
| 2,039,078 | 4/1936 | Hertwig | 404/85 |
| 2,258,205 | 10/1941 | Halvorson | 404/103 |
| 2,664,683 | 1/1954 | De Cato | 404/86 |
| 2,762,276 | 9/1956 | Mauch | 404/103 |
| 2,830,511 | 4/1958 | Wills et al. | 404/86 |
| 2,962,950 | 12/1960 | Martin | 404/86 |
| 3,071,051 | 1/1963 | Martin | 180/20 X |
| 3,340,782 | 9/1967 | Novak | 404/85 |
| 3,801,211 | 4/1974 | Perkins | 404/103 UX |

FOREIGN PATENTS OR APPLICATIONS

| | | | |
|---|---|---|---|
| 623,001 | 7/1961 | Canada | 404/129 |
| 1,144,366 | 4/1957 | France | 404/132 |
| 336,338 | 4/1916 | Germany | 404/132 |

*Primary Examiner*—Roy D. Frazier
*Assistant Examiner*—Thomas J. Holko
*Attorney, Agent, or Firm*—Webster B. Harpman

[57] ABSTRACT

A roller attachment for dump trucks has one or more road rollers mounted on a shaft which in turn is carried on the end of a pair of hydraulic piston and cylinder assemblies mounted on a beam positioned transversely of the truck and detachably secured to the frame thereof. Actuation of the hydraulic piston and cylinder assemblies from the hydraulic system of the dump truck moves the roller toward and away from a road surface so that when the roller is engaged on the road surface and the truck is moved forwardly and backwardly the roller will compact materials therebeneath.

1 Claim, 4 Drawing Figures

PATENTED JUL 22 1975 3,895,880

SHEET 1

ROLLER ATTACHMENT FOR TRUCKS

BACKGROUND OF THE INVENTION

1. Field of the Invention:

This invention relates to a roller attachment for a dump truck so that the weight of the dump truck and material therein may be used to weight the roller in a compacting rolling action.

2. Description of the Prior Art:

Prior devices of this type have mounted rollers on trailing arm assemblies secured to truck axles and frame and employed hydraulic piston and cylinders for moving the trailing arms toward and away from the truck. (See for example U.S. Pat. Nos. 2,962,950 and 3,071,051). A fixed mounting of a roller on a truck is disclosed in U.S. Pat. No. 1,458,751 and further proposals have been made to mount rollers on spreader boxes and the like as disclosed in U.S. Pat. Nos. 2,258,205 and 2,762,276.

This invention eliminates the problems found with the prior art devices and discloses a more practical and conveniently operated effective roller attachment for a dump truck.

SUMMARY OF THE INVENTION

A roller attachment for a dump truck includes extensions secured to the truck frame, a transversely positioned I-beam detachably secured to the extensions, hydraulic piston and cylinder assemblies on the beam movably positioning a transverse shaft and rollers thereon directly beneath the beam so that when the hydraulic piston and cylinder assemblies are connected to the hydraulic system of the dump truck the roller may be moved downwardly into engagement with a roadway and upon movement of the dump truck will roll and compact material such as for example patching material in holes in the roadway.

DESCRIPTION OF THE PREFERRED EMBODIMENT

Figure 1:
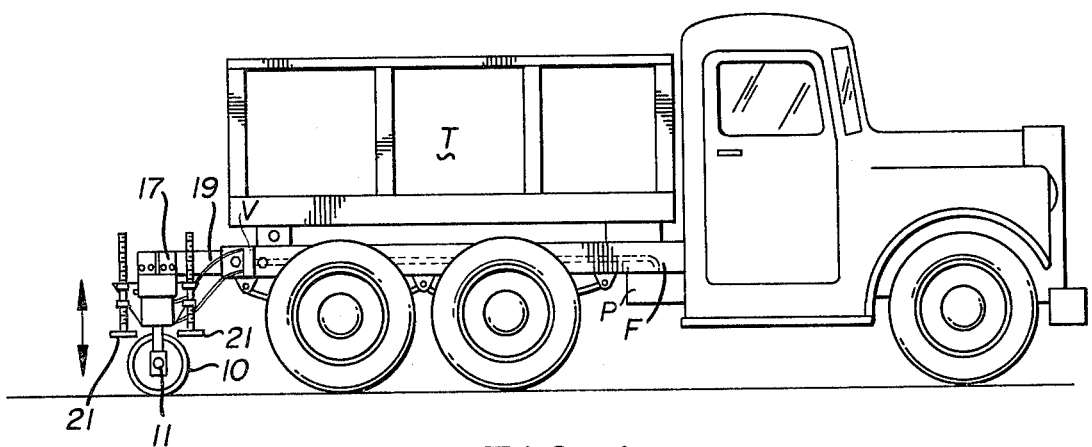
FIG. 1 is a side elevation of a dump truck showing the roller attachment in position thereon.
Figure 2:
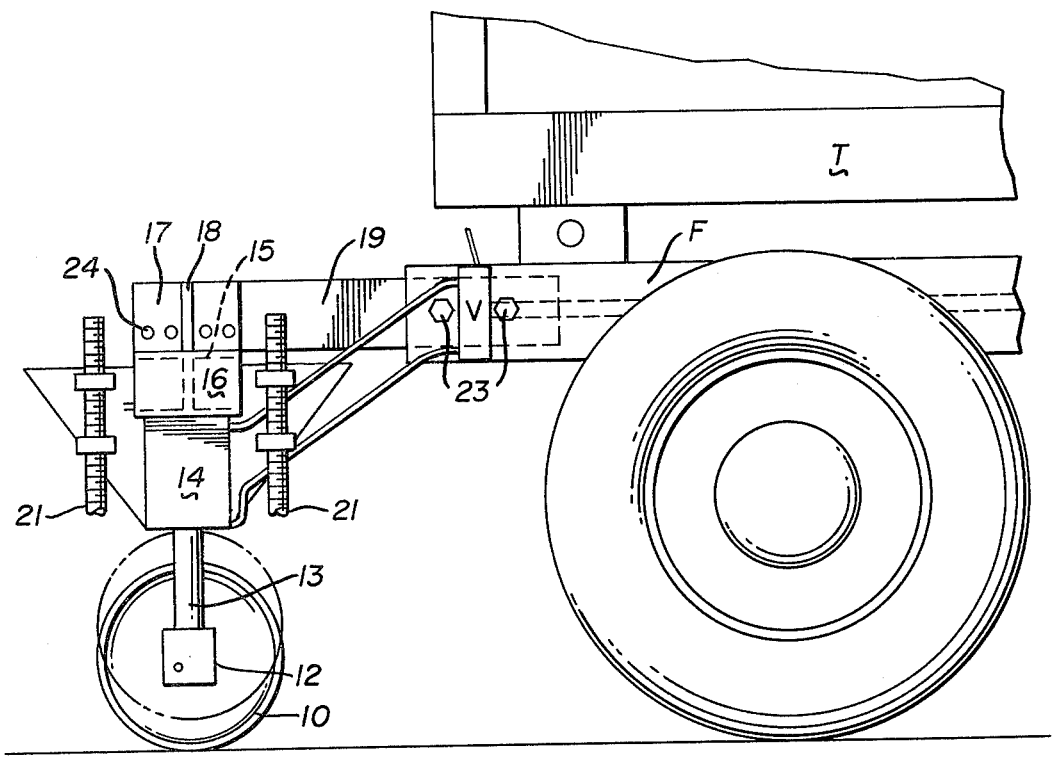
FIG. 2 is an enlarged view of the roller attachment with broken lines showing the roller in elevated position.

By referring to FIGS. 1 and 2 of the drawings, it will be seen that the roller attachment for trucks as disclosed herein consists of a multiple section roller 10, the sections thereof being rotatably positioned on a transverse shaft 11 with the ends of the transverse shaft 11 being journaled in bearings 12 on the lower ends of a pair of piston rods 13 which are parts of a pair of piston and cylinder assemblies 14. The piston and cylinder assemblies 14 are secured to a transversely positioned I-beam 15 which is enclosed in a tank 16 built thereabout. The upper surface of the I-beam 15 is provided with upstanding brackets 17 and gussets 18, the brackets 17 being positioned for engagement against the opposite sides of a pair of frame extensions 19 which in turn are attached to the main frame members F of a dump truck T. The frame extensions 19 may be detachably secured to the frame F of the dump truck and the brackets 17 may be and preferably are detachably secured to the frame extensions 19.

Figure 3:
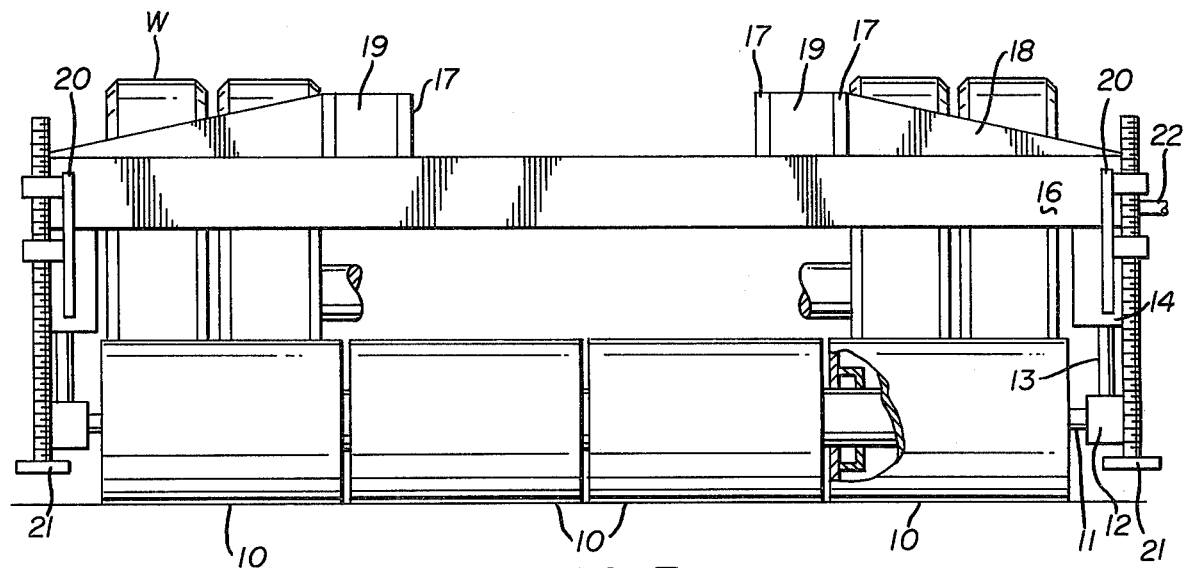
FIG. 3 is a rear elevational view of the roller attachment for dump trucks; and, FIG. 4 is a top plan view thereof.
Figure 4:
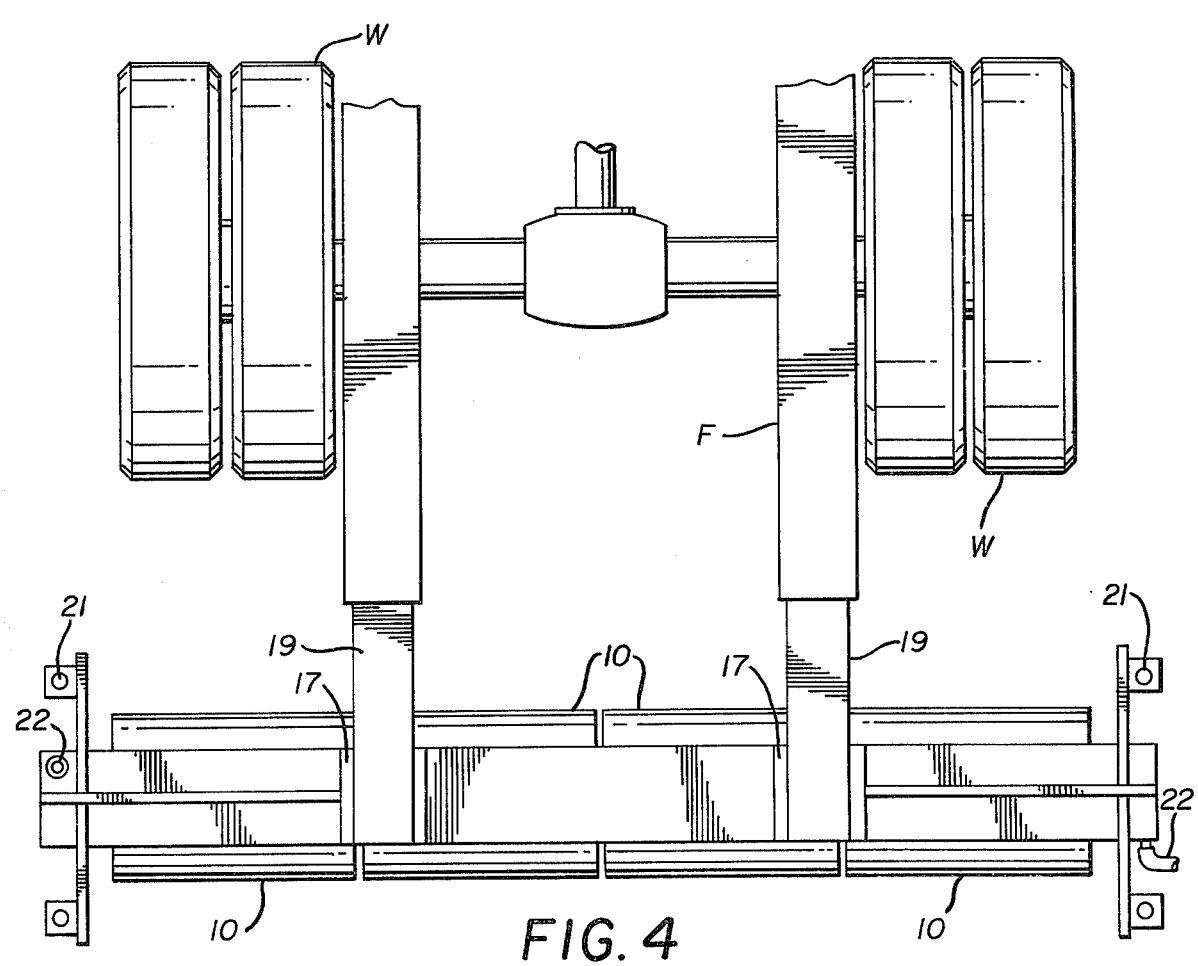

By referring now to FIGS. 3 and 4 of the drawings, it will be seen that the transverse beam 15 enclosed in the tank 16 is provided with a pair of right angular supports 20 and that these supports 20 mount pairs of screw jacks 21 which are provided to permit the beam 15, its tank 16 and associated mounting means including the brackets 17 to be moved upwardly into position for attachment to the frame F of the dump truck. When the device is attached to the truck as shown in FIGS. 1 and 2 of the drawings, the jacks 21 may be elevated to an inoperative position as illustrated or alternately simply removed therefrom as they are not used while the roller is attached to the truck.

Still referring to FIGS. 3 and 4 of the drawings, it will be seen that the tank 16 is provided with inlet and outlet ports 22 so that oil may be positioned in the tank 16 and pressurized if desired and conveniently removed therefrom as for spraying on the roller 10 as will occur to those skilled in the art. It will also be seen that the construction and arrangement of the roller attachment for trucks is such that the roller extends the full width of the wheels W of the truck so that the end portions of the roller 10 may be operated adjacent a curb or the like.

In operation the device is attached to the frame F of the truck T as seen in FIG. 2 of the drawings by affixing the frame extensions 19 to the frame F and securing them with fasteners 23. The screw jacks 21 are then actuated to elevate the transverse beam 15 and its integral tank 16 along with the hydraulic piston and cylinder assemblies 16 to a position where the brackets 17 engage the frame extensions 19 and fasteners 24 may be engaged. The screw jacks 21 are then retracted or removed and tubular connections, not shown, are attached between the hydraulic piston and cylinder assemblies 14 and the hydraulic system P on the truck T so that the hydraulic piston and cylinders can be energized thereby and the roller 10 raised and lowered relative to the truck T. A valve V provides manual control.

As shown in FIG. 2 of the drawings the roller 10 is moved to elevated position where it may be held by maintaining the hydraulic pressure in the piston and cylinder assemblies 14 or preferably by manually securing the same in elevated position. The roller is then moved along with the truck to a place of use, the material to be compacted is deposited and the roller moved downwardly into engagement therewith after having been freed from its mechanical supports.

In filling a chuck hole or the like in a roadway, the patching material is placed in the chuck hole and the roller moved downwardly in a position adjacent thereto until a desired portion of the weight of the truck and the load thereon are carried thereby whereupon the truck is moved forward and backwardly so as to move the roller 10 over the material to be compacted and smoothed.

It will thus be seen that a roller attachment for a dump truck has been disclosed which enables more efficient and rapid patching of roadways than has heretofore been possible and that the device can if necessary be used as a roller for other than patching operations as for example in helping to compact blacktop pavement, dirt or other materials as will occur to those skilled in the art.

Although but one embodiment of the present invention has been illustrated and described, it will be apparent to those skilled in the art that various changes and modifications may be made therein without departing from the spirit of the invention.

Having thus described my invention what I claim is:

1. In a hydraulically operated roller attachment for mounting on a dump truck having a main frame and a hydraulically operated dump body thereon and a hydraulic fluid power system therefor; said roller attachment comprising the combination of a transverse beam attached to the truck main frame at a point below the rear end of the dump body, said beam consisting of an elongated I-beam, side and end pieces sealingly attached to the opposite sides and ends thereof so as to reinforce the same and form a liquid holding tank thereabout, a vertically positioned hydraulic cylinder and piston ram secured to each end of said transverse beam, a roller positioned between and journeled on said rams below said cylinders and movable toward and away from said transverse beam on the vertical axes of said hydraulic cylinders and transverse beam, means in said hydraulic fluid power system communicating with said hydraulic cylinders and valve means in said communication means for controlling hydraulic fluid with respect to said hydraulic cylinders.

* * * * *